UNITED STATES PATENT OFFICE.

EDWARD HARRISON, OF NEW YORK, N. Y., ASSIGNOR TO R. W. W. SIMPSON, OF SAME PLACE.

IMPROVED INFLAMMABLE COMPOSITION FOR FILLING PROJECTILES.

Specification forming part of Letters Patent No. 41,577, dated February 9, 1864.

*To all whom it may concern:*

Be it known that I, EDWARD HARRISON, of the city, county, and State of New York, have invented a new Inflammable Composition for Incendiary Projectiles, or to be used in any way for incendiary purposes; and I do hereby declare that the following is a full, clear, and exact description of the component parts of and mode of compounding the same.

This composition consists of ordinary gunpowder, amorphous phosphorus, and bisulphide of carbon. Its characteristics are that it ignites easily, may be made to burn more or less quickly, and is very difficult to extinguish.

The proportions of the gunpowder and phosphorus may be considerably varied, according to the speed with which the composition is desired to burn. The quickest combustion is obtained by the use of about two parts, by weight, of phosphorus to twenty-five of gunpowder, and may be made to burn as slowly as may be desired by a less or greater increase of the quantity of phosphorus. The quantity of bisulphate of carbon is to be sufficient to produce with the other ingredients a thick paste or solid mass.

To make the composition, I first reduce the gunpowder and amorphous phosphorus separately to fine powder by trituration in a mortar, or by other suitable means, then place them in the desired proportions in a fine sieve, and sift them together into a suitable receptacle as many times as may be necessary to effect a perfect mixture, and gradually add bisulphide of carbon to the mixture, and stir or grind together till the whole forms a thick paste or solid mass.

This compound may be used in the same manner as other inflammable compositions used in incendiary shells for setting fire to vessels or wooden buildings, or any combustible materials. I propose generally to employ it in a shell, either in a separate compartment from the bursting charge, or in capsules or cases of india-rubber or other material in the same chamber with the bursting charge, which may consist of ordinary gunpowder or of any other suitable explosive compound. The composition is ignited by the gunpowder or bursting charge on the bursting of the partition by the explosion of the latter charge, and on the bursting of the walls of the shell is scattered in the ignited state in all directions, adhering to everything with which it comes in contact, burning slowly and setting on fire all combustible materials, and being very difficult to extinguish.

I do not confine myself to the precise proportions of the several ingredients herein specified; but

What I claim as my invention, and desire to secure by Letters Patent, is—

The within-described inflammable or incendiary compound composed of gunpowder, amorphous phosphorus, and bisulphide of carbon.

EDWARD HARRISON.

Witnesses:
R. W. WINFIELD SIMPSON,
M. M. LIVINGSTON.